(12) United States Patent
Russo (10) Patent No.: US 11,674,507 B2
(45) Date of Patent: Jun. 13, 2023

(54) SEDIMENT CAPTURE SYPHON SYSTEM AND PUMP

(71) Applicant: Richard Charles Russo, Abbeville, LA (US)

(72) Inventor: Richard Charles Russo, Abbeville, LA (US)

( * ) Notice: Subject to any disclaimer, the term of this patent is extended or adjusted under 35 U.S.C. 154(b) by 863 days.

(21) Appl. No.: 16/516,254

(22) Filed: Jul. 19, 2019

(65) Prior Publication Data

US 2020/0101401 A1    Apr. 2, 2020

Related U.S. Application Data

(60) Provisional application No. 62/764,155, filed on Jul. 20, 2018.

(51) Int. Cl.
| | | |
|---|---|---|
| *F04B 17/03* | (2006.01) | |
| *B01D 21/30* | (2006.01) | |
| *C02F 11/121* | (2019.01) | |
| *C02F 1/00* | (2023.01) | |
| *B01D 21/00* | (2006.01) | |
| *B01D 21/34* | (2006.01) | |
| *B01D 21/24* | (2006.01) | |
| *C02F 103/00* | (2006.01) | |

(52) U.S. Cl.
CPC .......... *F04B 17/03* (2013.01); *B01D 21/0012* (2013.01); *B01D 21/2461* (2013.01); *B01D 21/302* (2013.01); *B01D 21/34* (2013.01); *C02F 1/004* (2013.01); *C02F 11/121* (2013.01); *C02F 2001/007* (2013.01); *C02F 2103/007* (2013.01); *C02F 2201/005* (2013.01); *C02F 2201/009* (2013.01); *C02F 2209/40* (2013.01)

(58) Field of Classification Search
None
See application file for complete search history.

(56) References Cited

U.S. PATENT DOCUMENTS

| | | | |
|---|---|---|---|
| 4,144,174 A | | 3/1979 | Graham |
| 4,892,658 A | * | 1/1990 | Martin .................... C02F 3/302 |
| | | | 210/93 |
| 8,246,818 B2 | * | 8/2012 | Korzeniowski .... B01D 24/4631 |
| | | | 210/275 |

(Continued)

FOREIGN PATENT DOCUMENTS

| | | |
|---|---|---|
| KR | 100408854 B1 | 11/2003 |
| WO | 2018047453 A1 | 3/2018 |

*Primary Examiner* — Jonathan M Peo
(74) *Attorney, Agent, or Firm* — Ingenium Patents LLC; Peter R. Kramer (57) ABSTRACT

A solar powered sediment capture system is disclosed for collecting sediment at environment sites such as lakes and rivers. A mechanical pump directs water from a containment basin to an upper tank and an antistatic pressure tank, both which are elevated. Gravity flow from the upper tank generates vacuum to establish a syphon for drawing a flowable sediment slurry from an environmental borrow site to a filter. Effluent from the filter passes down to the containment basin, which has water level at a lower elevation than that of the borrow site. Anti-static and driller conduits permit gravity flow from the anti-static tank to suspend the sediment and to maintain the slurry at the syphon inlet in a flowable state.

2 Claims, 12 Drawing Sheets
(5 of 12 Drawing Sheet(s) Filed in Color)

(56) References Cited

U.S. PATENT DOCUMENTS

2009/0294356 A1\* 12/2009 Beggs ................... C02F 3/04
                                                    210/275
2014/0263048 A1\*  9/2014 Kasparian ............ C02F 3/006
                                                    210/220
2017/0296946 A1\* 10/2017 Vette .................... B01D 25/164

\* cited by examiner

SEDIMENT CAPTURE SYPHON SYSTEM AND PUMP

CROSS-REFERENCE TO RELATED APPLICATIONS

This application claims benefit of the filing date of provisional application No. 62/764,155 filed on Jul. 20, 2018. The entire contents of application No. 62/764,155 are hereby incorporated by reference.

BACKGROUND OF THE INVENTION

Field of the Invention

The subject matter of the inventive subject matter relates to apparatuses and methods for removal of sediments and debris from the bottom of waterways—including rivers, streams, eddies and coves.

Description of Related Art Including Information Disclosed Under 37 CFR 1.97 and 1.98

KR100408854B1 discloses a syphon on a floating hull which draws sludge and delivers the sludge to a water treatment tank where sediment collected can settle. A first syphon conduit draws sediment to the hull with a scraper-impeller positioned at the lower end of the first syphon conduit. The sediment passes through a flexible hinge portion to a second syphon conduit which delivers the sediment to the water treatment tank. An electric motor moves the first syphon conduit back and forth with a belt drive mechanism. The upper end of the first syphon conduit is attached to an upper rail mounted on two lower rails via wheels at each end of the upper rail. The position of the upper rail which is pushed or pulled along the lower rails by a motor-driven bogie determines the relative position of the syphon tube in the floating hull. It is essentially floating hull with a simple syphon tube, the position of which is determined by the location of the hull and position of the upper rail within the hull. The syphon sucks sediment and delivers it to a water treatment tank.

U.S. Pat. No. 4,144,174 is an apparatus for collecting sludge off the bottom of settling tanks such as used in water treatment systems. A syphon tube is mounted in a settling tank on a traveling carriage.

WO2018047453A1 discloses a method for treating water from a sedimentation basin. Water flows through various chambers and is directed to a filter and then directed to a culvert and overflows to a "purification sewer", which is just a tank and exits by overflowing the tank. A syphon is positioned direct reverse flowing fluid as wastewater for maintenance.

Korzeniowski U.S. Pat. No. 8,246,818 discloses a water filtration system for treatment of water and wastewater. Water flows from an inlet, which is positioned above the outlet, to an internal distribution pipe and then downward into a filter vessel. Filter media is disposed toward the bottom of the filter vessel. The water level within the filter vessel is maintained so that its surface is above the top of the filter media. Water is drawn through the filter by means of a syphon. After passing through the filter water is collected by filter underdrain system and into an outlet pipe. The outlet pipe has an inverted U configuration in which the filtered water flows upward and then bends downward as a discharge pipe. Due to the difference in height between the water level surface above the filter and outlet of the discharge pipe a syphon is established to draw the water through the filter and out from the discharge pipe.

BRIEF SUMMARY OF THE INVENTION

Water is pumped through a conduit to an upper tank and an anti-static tank from a containment basin below. A vacuum between the upper tank and a filter assembly is created by gravity flow of water after opening a vacuum pressure valve which permits water to flow through another conduit from the upper tank back toward the containment basin thereby creating vacuum. The vacuum is used to draw water and sediment from the borrow site into a syphon inlet and through a syphon inlet conduit to the filter assembly which collects the sediment. A conduit directs water from the filter assembly and exits the syphon through an outlet which is positioned in the containment basin. The surface of water in the containment basin is lower than the surface of the borrow site water thereby providing syphon suction. Sediment can be discharged from the filter by opening a valve. The apparatus suspends sediment from the environmental borrow site into a flowable slurry using hydrostatic pressure by directing water from an anti-static upper tank through a driller conduit. Similarly, an anti-static conduit directs water from the anti-static tank to the syphon inlet to re-establish sediment flow when there is insufficient water entering the syphon. Therefore, this apparatus creates a flowable slurry using hydrostatic pressure and does not require a motor-powered mechanical impeller to produce a flowable slurry of sediment.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

| Numbering of Items in the Drawings | |
|---|---|
| 1 | upper tank |
| 2 | anti-static pressure tank |
| 3 | Filter assembly |
| 3A | Screen |

-continued

Numbering of Items in the Drawings

| | |
|---|---|
| 3C | Filter partition |
| 4 | Receiving receptacle |
| 5 | Borrow site |
| 5A | Syphon inlet connecter |
| 5B | Water surface |
| 5C | Sediment |
| 5D | Driller conduit outlet |
| 5E | Screen |
| 6 | Containment basin |
| 6A | Syphon Outlet |
| 6B | Water surface |
| 6C | Water surface |
| 6D | Containment basin partition |
| 7 | Upper syphon vent valve |
| 7A | Upper syphon vent line |
| 8 | Borrow site vent valve |
| 8A | Borrow site vent valve pipe |
| 9 | Containment basin vent valve |
| 10 | Battery |
| 10A | Battery switch |
| 11 | Pump valve |
| 11A | Pump valve conduit |
| 12 | Left upper tank valve |
| 12A | Upper tank to antistatic conduit |
| 13 | Anti-static filler valve |
| 14 | Right upper tank valve |
| 15 | Vacuum pressure valve |
| 15A | Vacuum pressure line |
| 16 | Lower syphon vent valve |
| 17 | Anti-static valve |
| 17A | Anti-static conduit |
| 18 | Driller valve |
| 18A | Driller conduit |
| 19 | Filter vent valve |
| 20 | Borrow site drain valve |
| 21 | Upper knife valve |
| 22 | Lower knife valve |
| 23 | Center upper tank valve |
| 23A | Center upper tank conduit |
| 24 | Pipeline flow valve |
| 24A | Pipeline flow conduit |
| 25 | Containment basin drain valve |
| 26 | Anti-static tank vent |
| 27 | Vacuum vent |
| 28 | Borrow site vent valve |
| 29 | Overflow vent |
| 30 | Overflow reservoir |
| 31 | Solar panel |
| 31A | Power source wire |
| 32 | Syphon influx conduit |
| 34 | Syphon efflux conduit |
| 36 | Pump |
| 38 | Outlet chamber |
| 40 | Pump chamber |
| 45 | Apparatus |
| 47 | Platform |
| 52 | Left collar (to upper tank valve) |
| 54 | Center collar (to syphon outlet 34) |
| 56 | Right collar (to right upper tank valve 14) |
| 58 | Sediment receptacle |
| 60 | Cover |

DETAILED DESCRIPTION OF THE INVENTION

Figure 1:
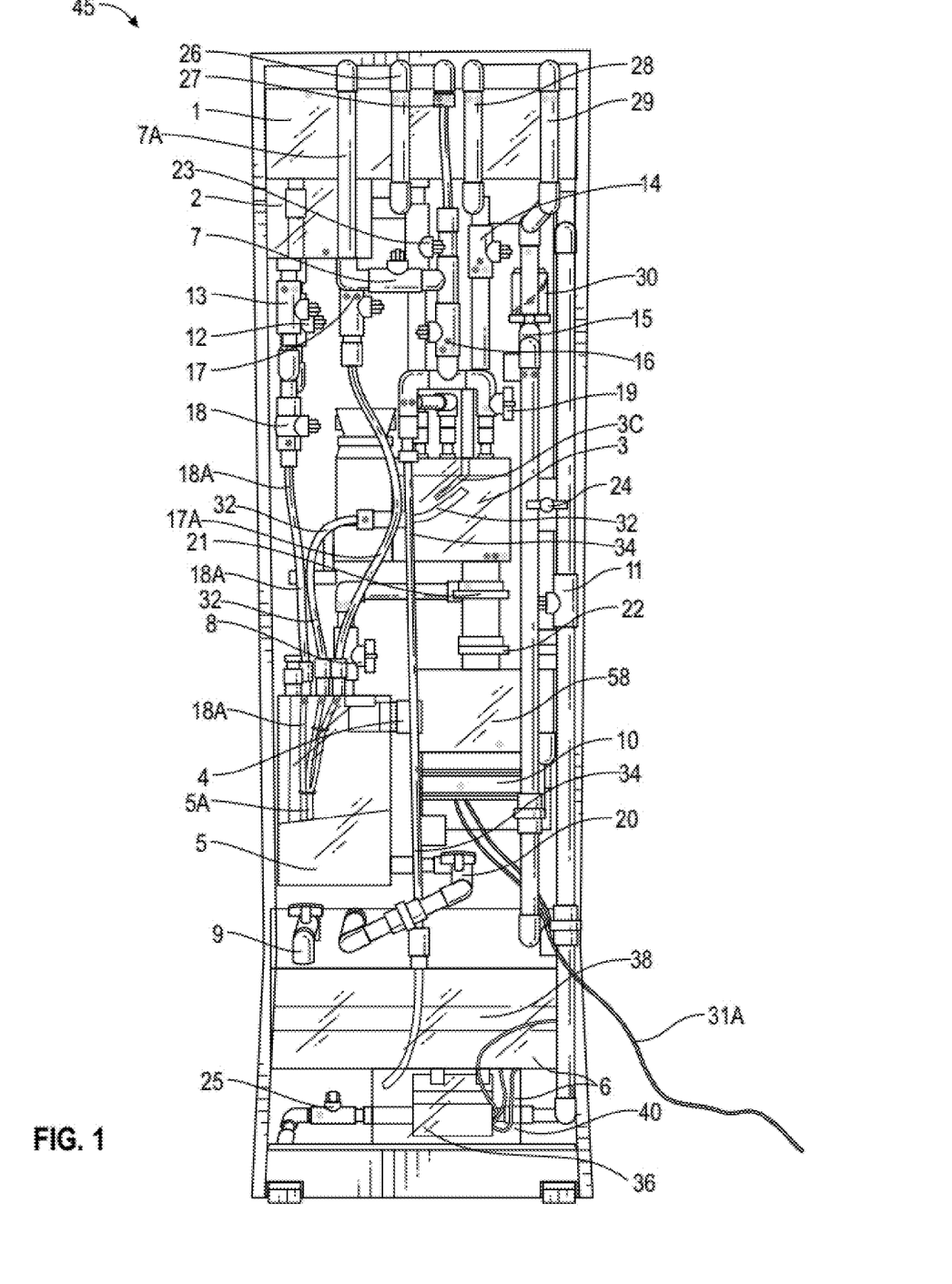
FIG. 1 Front uncovered view of a demonstration model of the syphon apparatus
Figure 2:
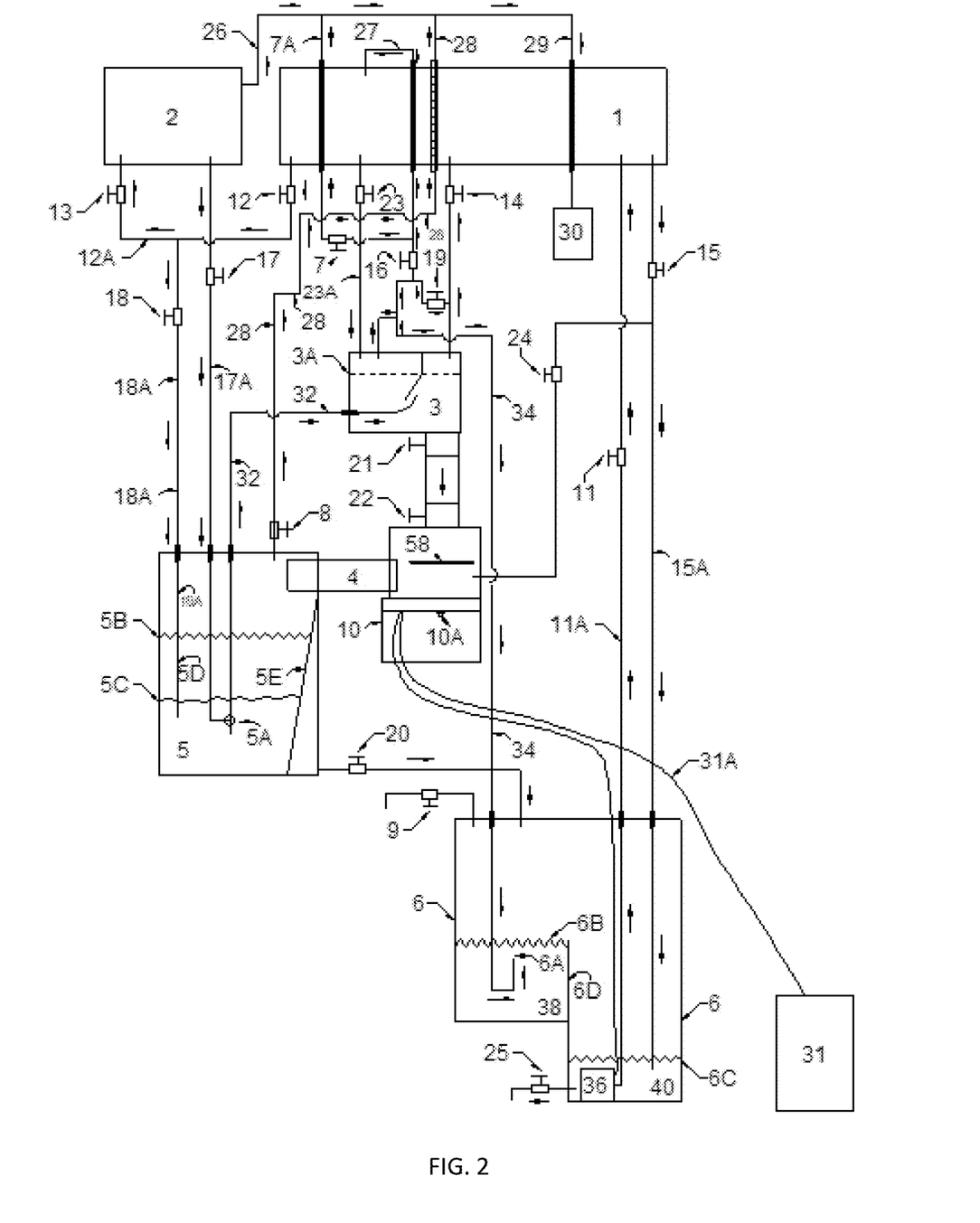
FIG. 2 Schematic drawing illustrating the principles of the demonstration model
Figure 3:
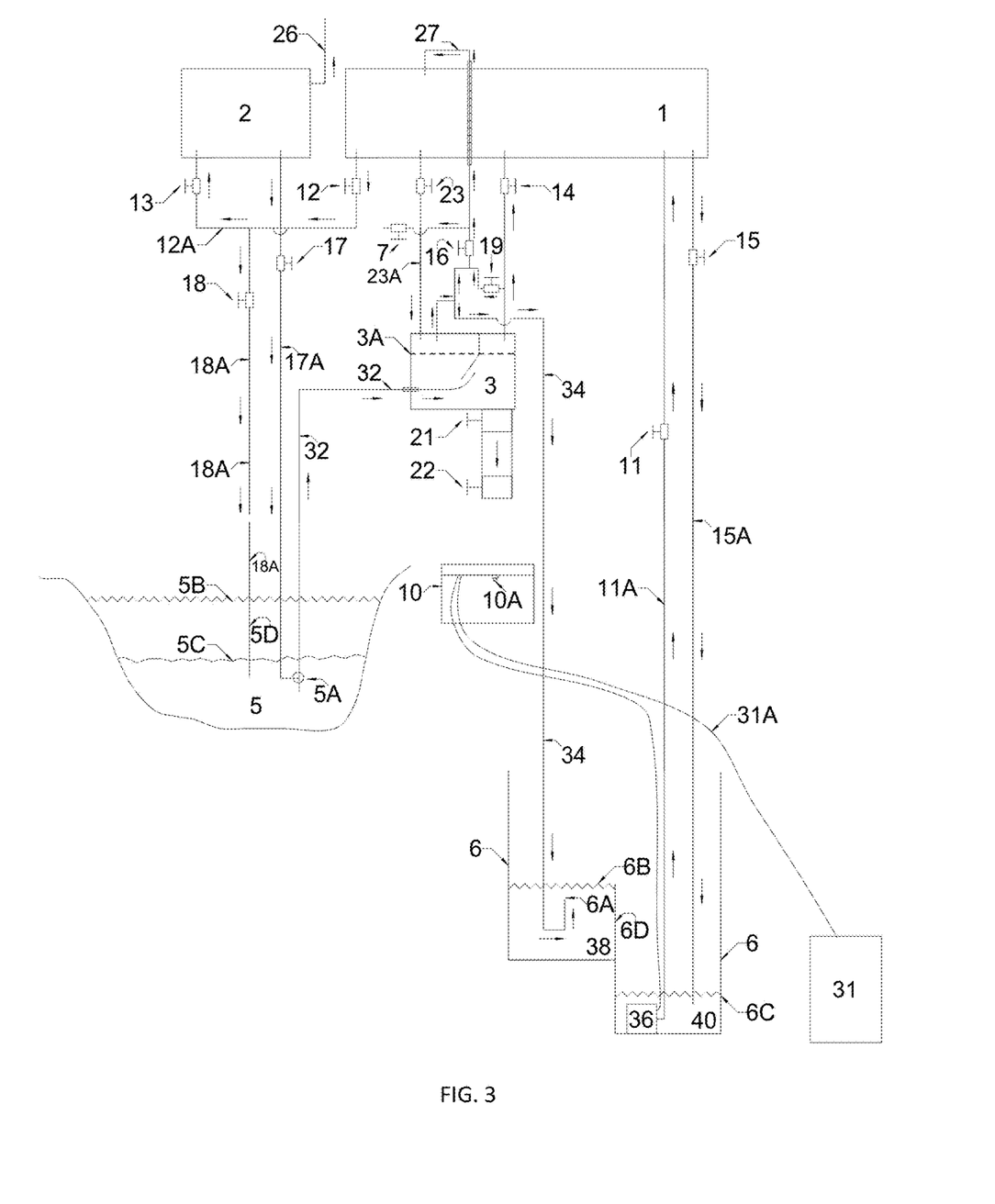
FIG. 3 Schematic view of an embodiment for use in a natural environment

A demonstration embodiment is shown in FIG. 1. FIG. 2 is a schematic of an apparatus 45 which illustrates the principles of operation. FIG. 3 is similar to FIG. 2 and illustrates an embodiment for use in a natural environment. Environmental embodiments do not require a pipeline or borrow site vent valves and lines which are particular to the indoor demonstration model that has an enclosed borrow site chamber which represents an environmental borrow site.

A borrow site FIGS. 1 and 2, is represented by a closed compartment 5 containing water, with surface 5B, sand or sediment having upper surface 5C within the apparatus. A slurry of suspended sediment is drawn from syphon inlet at the connector 5A to a filter assembly 3 via syphon inlet line 32. The syphon inlet line can be constructed of clear plastic tubing for a demo model. Sediment that enters the filter assembly passes through an open upper knife valve settling in the space between open upper knife valve and closed lower knife valve. When upper knife valve is closed and lower knife valve opened, accumulated sediment can be discharged from the filter assembly. While in operation syphon suction is established with water and sediment slurry drawn into the filter assembly and with water efflux from filter 3 via syphon outlet line 34 and flowing to syphon outlet 6A which is located in outlet chamber 38 of containment basin 6. Containment basin 6 is divided into outlet chamber 38 and pump chamber 40 by partition 6D. Pump 36 directs water through conduit 11A and eventually to tank 1. Screen 5E removes particles from borrow site water entering the containment basin. The immediate source of power for the pump is battery 10 which has switch 10A. The battery is further electrically connected to solar panel 31 via cable 31A. Before the syphon system is started water is initially added to the pump chamber 40. The surface of the water in the pump chamber is indicated by 6C. Water surface in the outlet chamber is indicated at 6B. It should be noted that water surface 5B is at a higher elevation than 6B and 6C, and with the water level at 6B at a higher elevation than in 6C, in order to maintain syphon suction. An upper tank 1 and anti-static pressure tank 2 are located in the upper portion of the system. Water is pumped by pump 36 through pump valve conduit 11A directing water from pump chamber 40 to upper tank 1. Pump 36 is connected to a power source by a power source wire 31A. The power source for pump 36 may include a battery 10, with on/off switch 10A, and solar panel 31 or another suitable source of electric power. FIGS. 2 and 3 show the battery in electrical communication with the solar panel. Upper tank 1 and anti-static pressure tank 2 can be filled simultaneously by pumping water to upper tank 1 with upper tank valve 12 and anti-static filler valve 13 open. Water can flow back to pump chamber 40 through vacuum pressure line 15A when vacuum pressure valve 15 is opened. When starting the syphon, valves 7, 11, 12, 14, 19, and 23 are closed with valve 15 open, which generates vacuum within the filter, and valve 16 open. Valve 13 can be open to supply water later to driller valve 18, which is closed while starting the syphon. The vacuum within filter assembly 3 draws fluid from the borrow site and outlet chamber 38 thereby purging air from the filter assembly. Once the air is purged valve 16 can be closed since the syphon has been established. Anti-static pressure tank 2 can be filled by pumping water from pump 36 with valve 12, valve 13, and valve 11 open and valve 14, 15 and 23 closed. During syphon operation with sediment flowing into inlet 5A, if static pressure develops due to insufficient water content in the slurry, the syphon may operate slowly or stop. Anti-static pressure can be relieved by opening anti-static valve 17 wherein water flows from anti-static pressure tank 2 to syphon inlet connector 5A. Driller conduit 18A permits gravity flow of water from anti-static pressure tank 2 into the sediment with driller conduit outlet 5D submerged in the sediment 5C thereby suspending sediment particles in borrow site water. Pipeline conduit 24A connects center upper tank conduit 11A to the borrow site and permits water to flow from pump chamber 40 to the borrow site when pipeline flow valve 24 is opened. This feature is omitted in environmental embodiments.

FIG. 3 shows an embodiment adapted for use in the natural environment. The borrow site is a river, lake or other natural body of water having sediment. The containment basin is excavated to the proper depth to enable syphon operation but otherwise operates in the same manner as the demonstration model.

Figure 4:
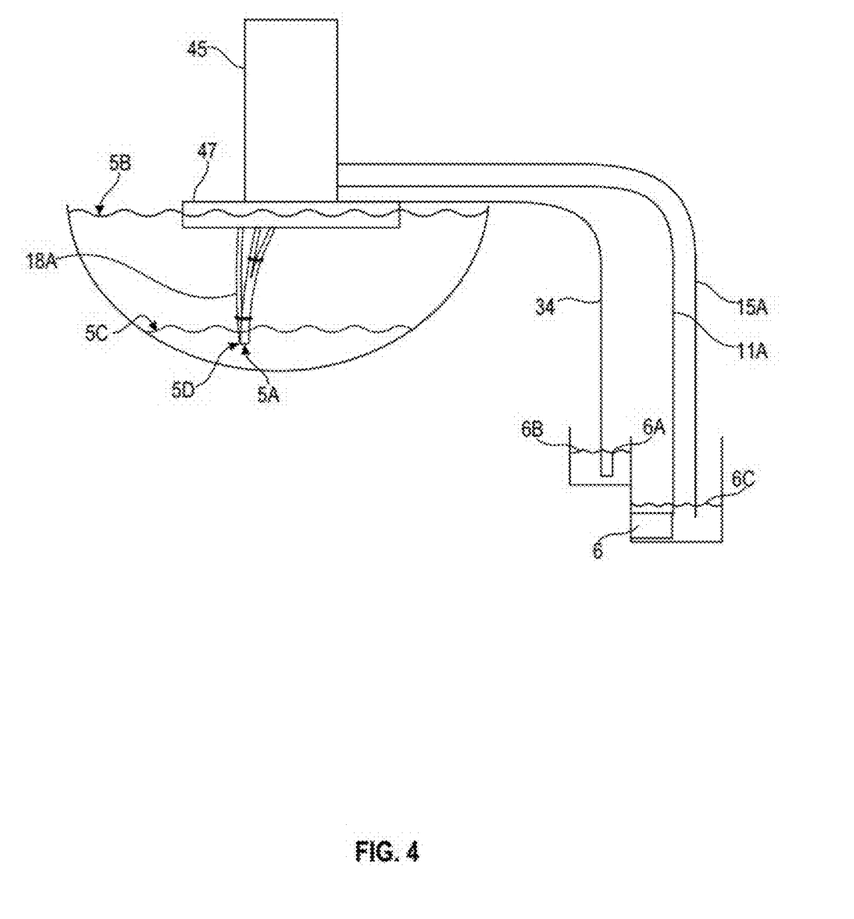
FIG. 4 Schematic view of apparatus suspended on a floating platform

FIG. 4 is a schematic with the apparatus of FIG. 3 shown on floating platform 47. Conduits to the driller valve, filter, and anti-static tank extend through the borrow site water to the sediment below as shown. A two-compartment containment basin comprised of outlet chamber 38 and pump chamber 40 with the outlet and pump chambers separated by partition 6D. Syphon efflux conduit 34 extends below the water surface 6B in outlet chamber 38. Vacuum pressure line 15A and pump valve conduit 11A extend below the water surface 6C in pump chamber 40. The internals of apparatus 50 though not shown in FIG. 4 are essentially the same and operate according to the same principle as for the embodiment of FIG. 3. Alternatively, for example, the apparatus can be positioned on a riverbank rather than on a floating platform.

Schematic drawings FIGS. 2 and 3 provide an uncluttered view illustrating the principles of operation.

Figure 5:
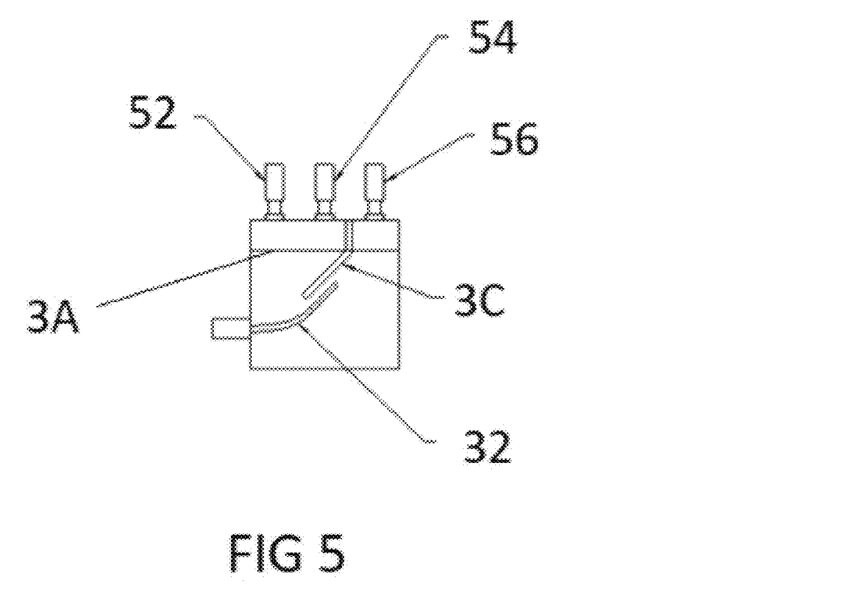
FIG. 5 Filter assembly, detailed view
Figure 6:
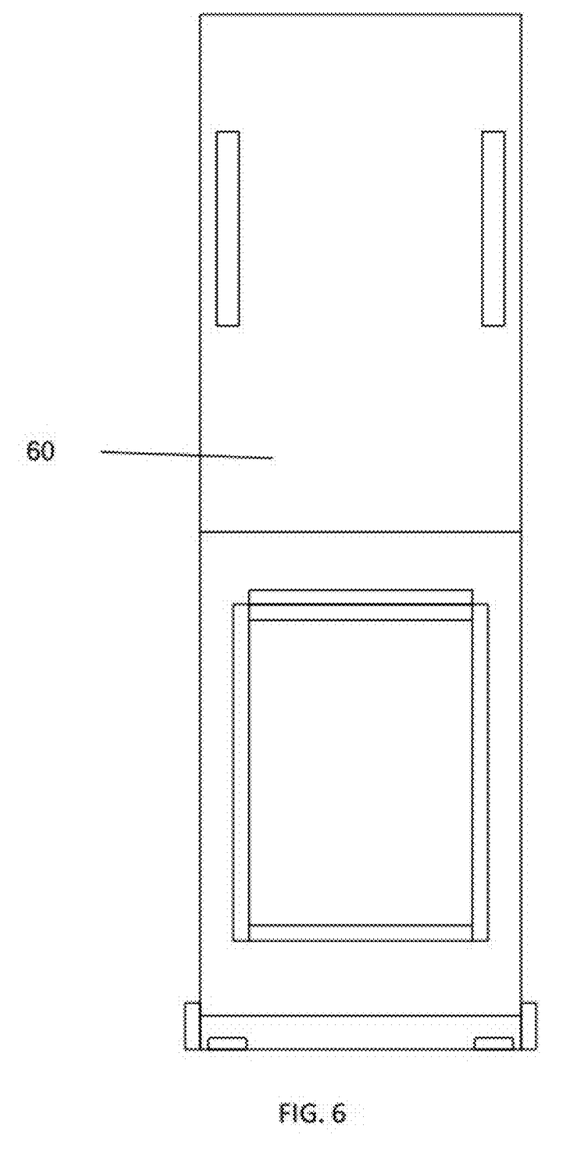
FIG. 6 Front view with cover
Figure 7:
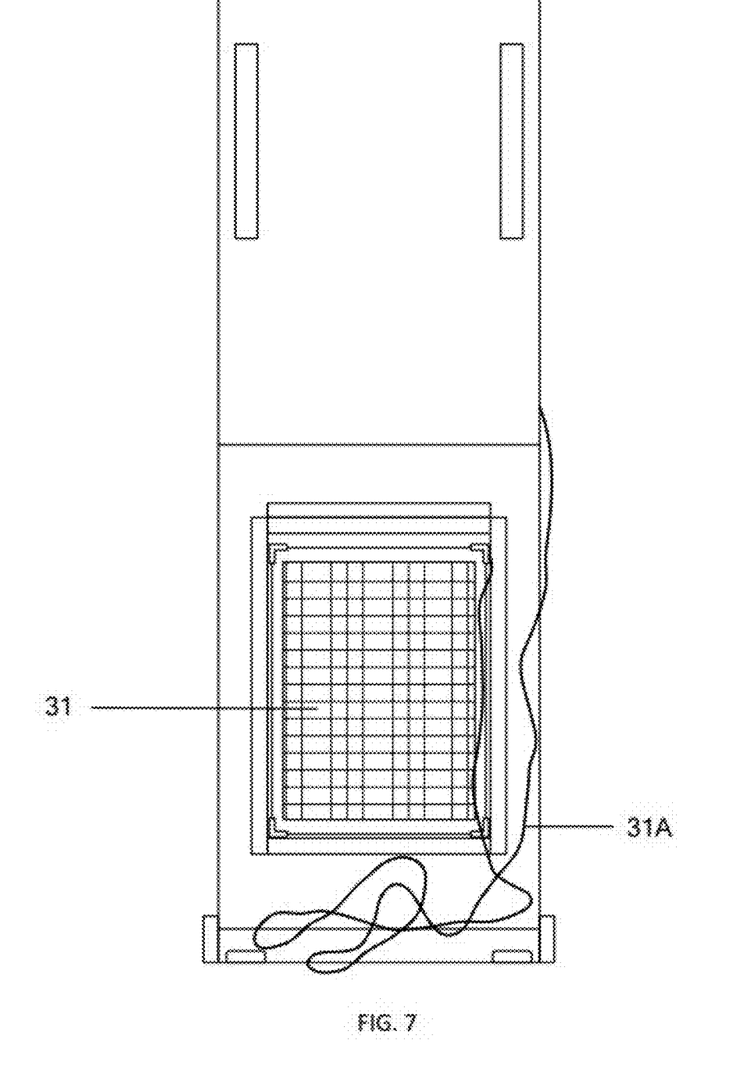
FIG. 7 Solar panel and power cord
Figure 8:
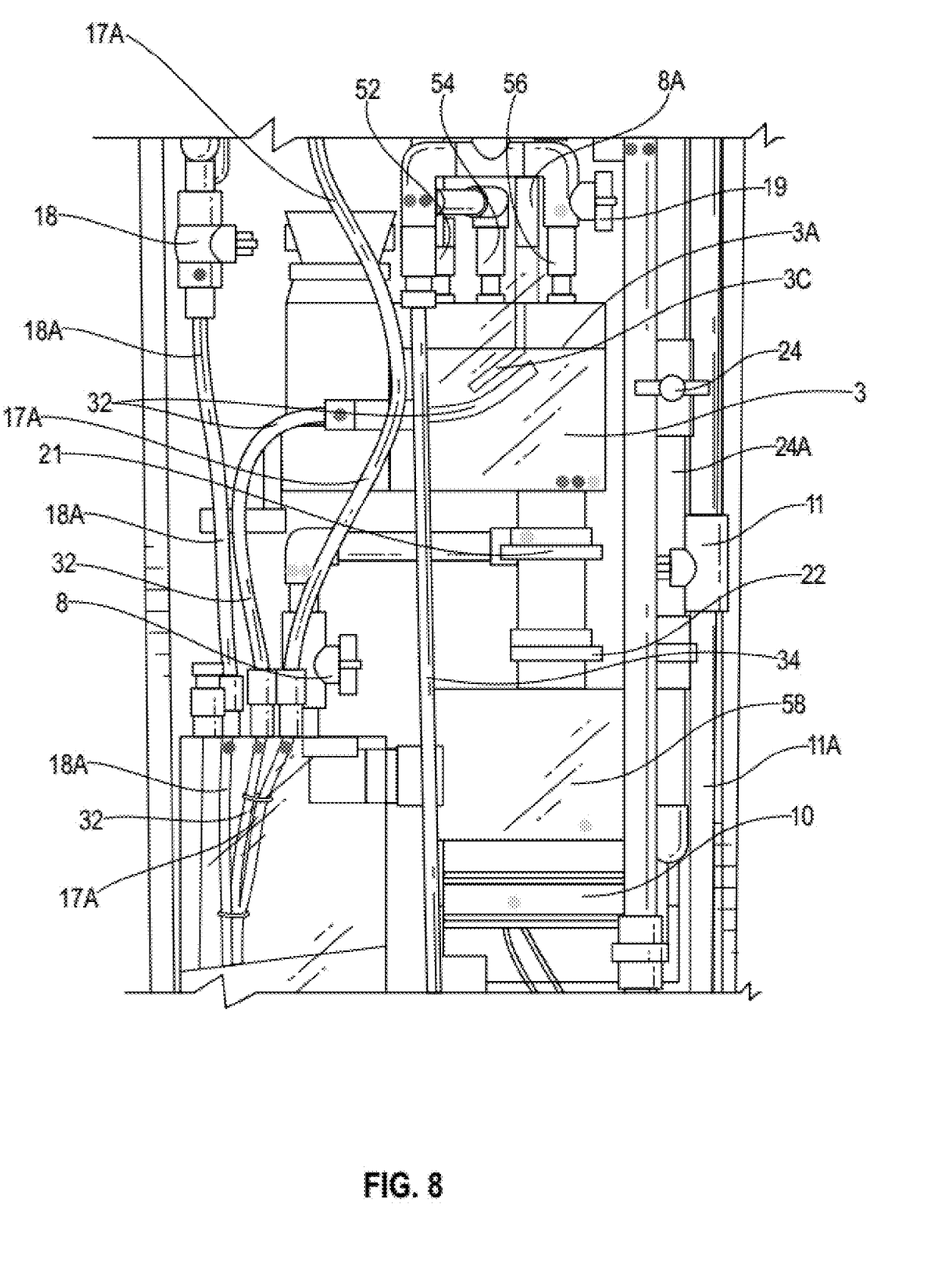
FIG. 8 Enlarged view of center portion of FIG. 1
Figure 9:
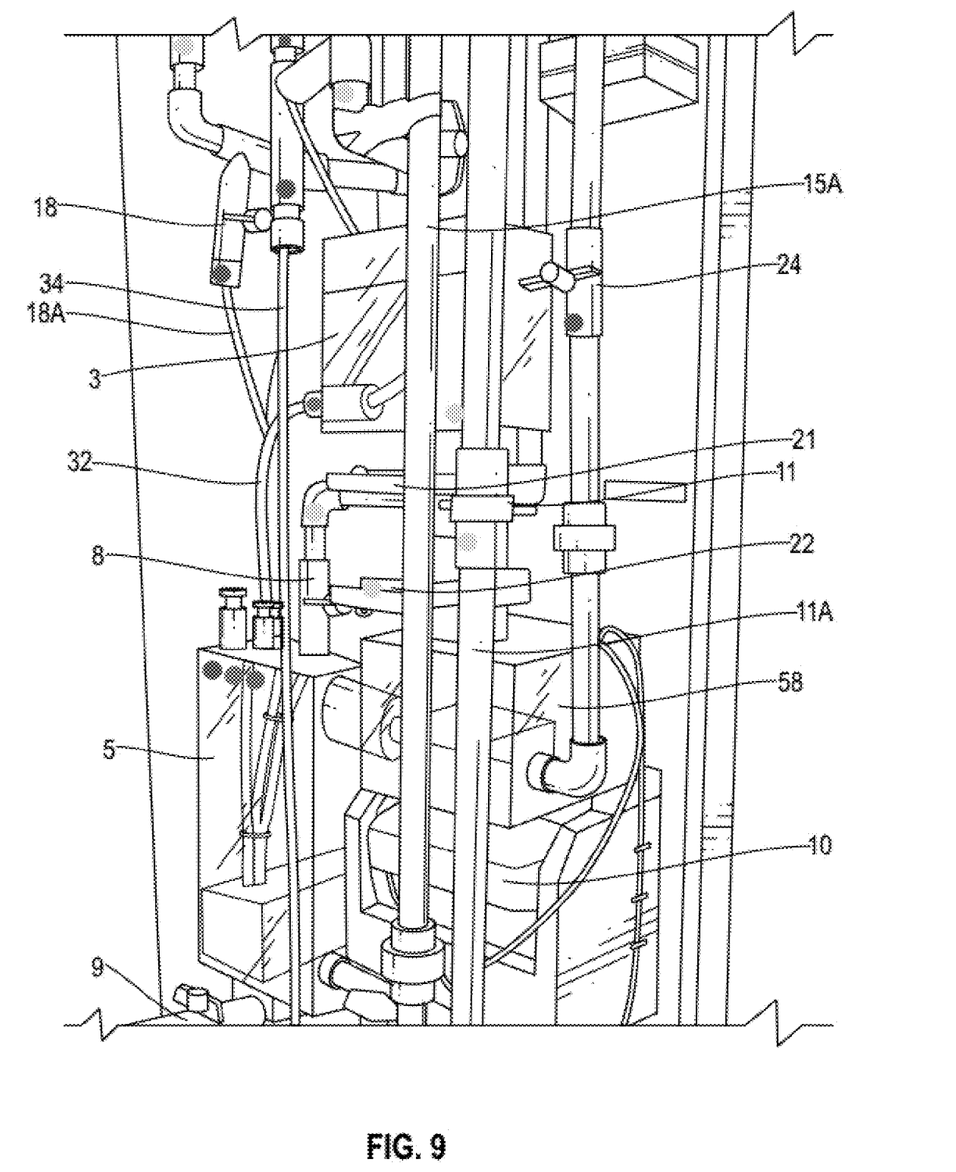
FIG. 9 Enlarged view of center portion of uncovered apparatus
Figure 10:
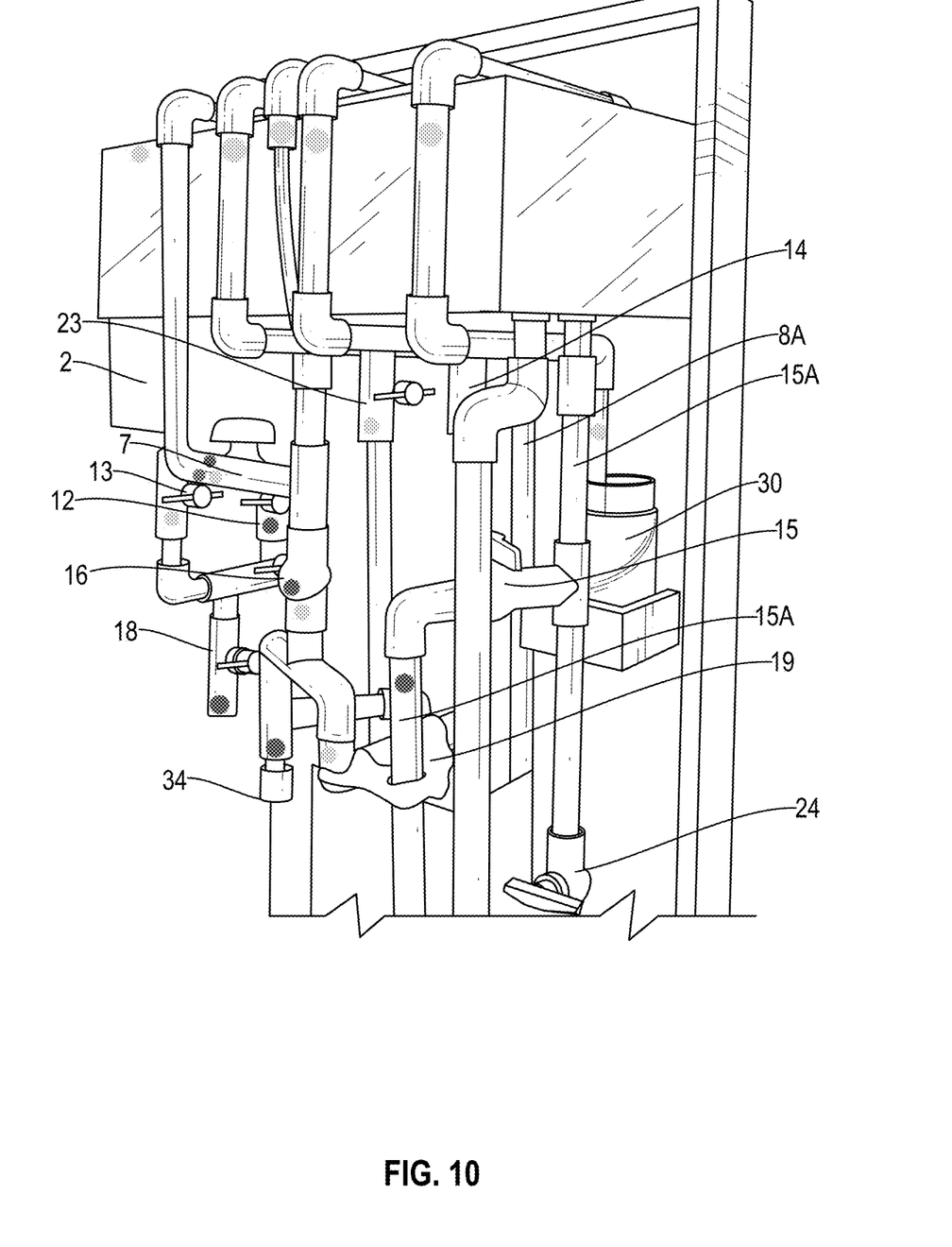
FIG. 10 Right side angle view of upper portion of uncovered apparatus
Figure 11:
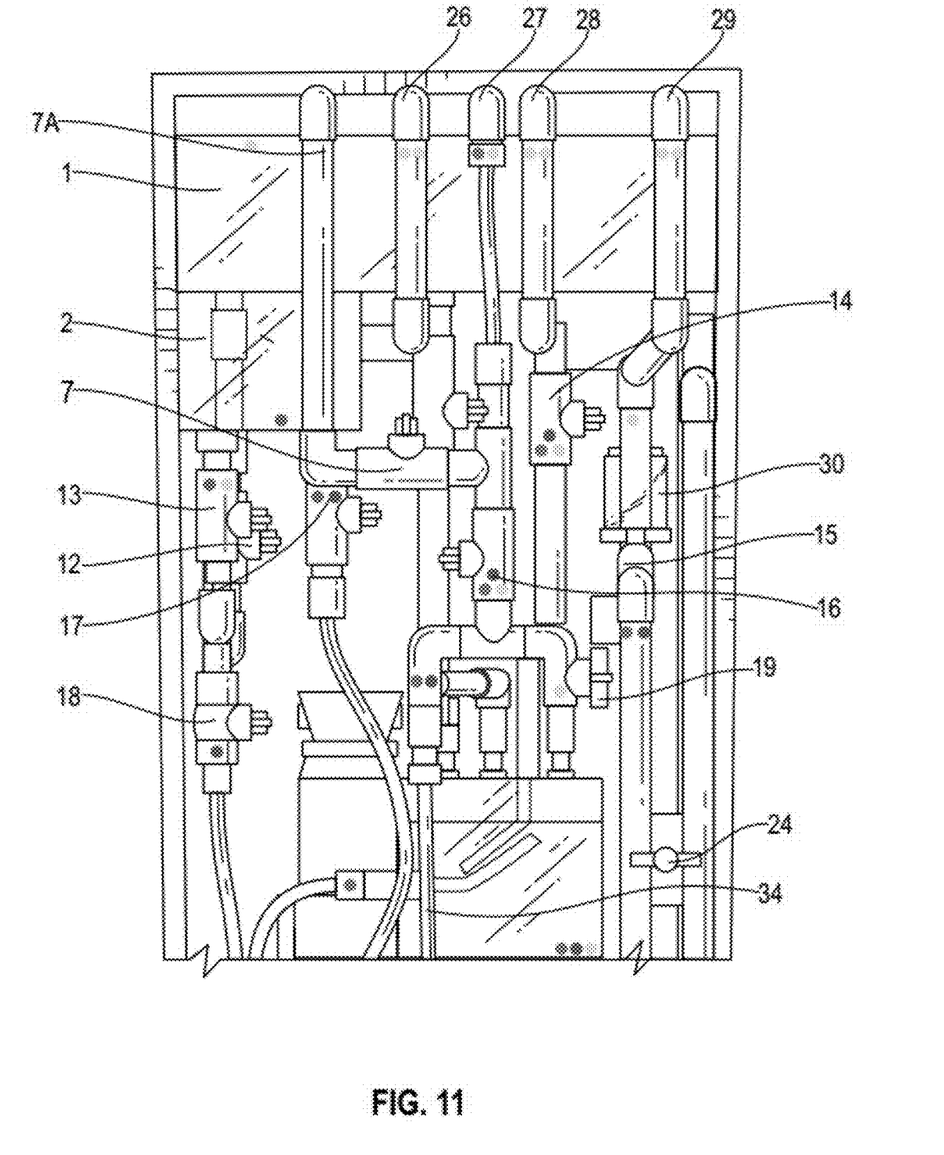
FIG. 11 Front view of upper portion of uncovered apparatus

FIG. 5 shows a preferred design for the filter which is positioned above upper knife valve 21. At the top of the filter are three collars 52, 54, and 56. Collar 52 connects to center upper tank valve 23 via a conduit. Center collar 54 is ultimately connected to syphon efflux conduit 34. Collar 56 accommodates a conduit to right upper tank valve 14. The filter and its three collars are also shown in FIG. 8. 3A is a screen, which prevents large particles or small aquatic animals form entering the uppermost portion of the filter, and 3C is a filter partition which functions to direct any incoming air to valve 14 via collar 56.

FIGS. 8-11 illustrate portions of the demonstration model in detail. These images are included as a supplement to FIGS. 1-3.

Figure 12:
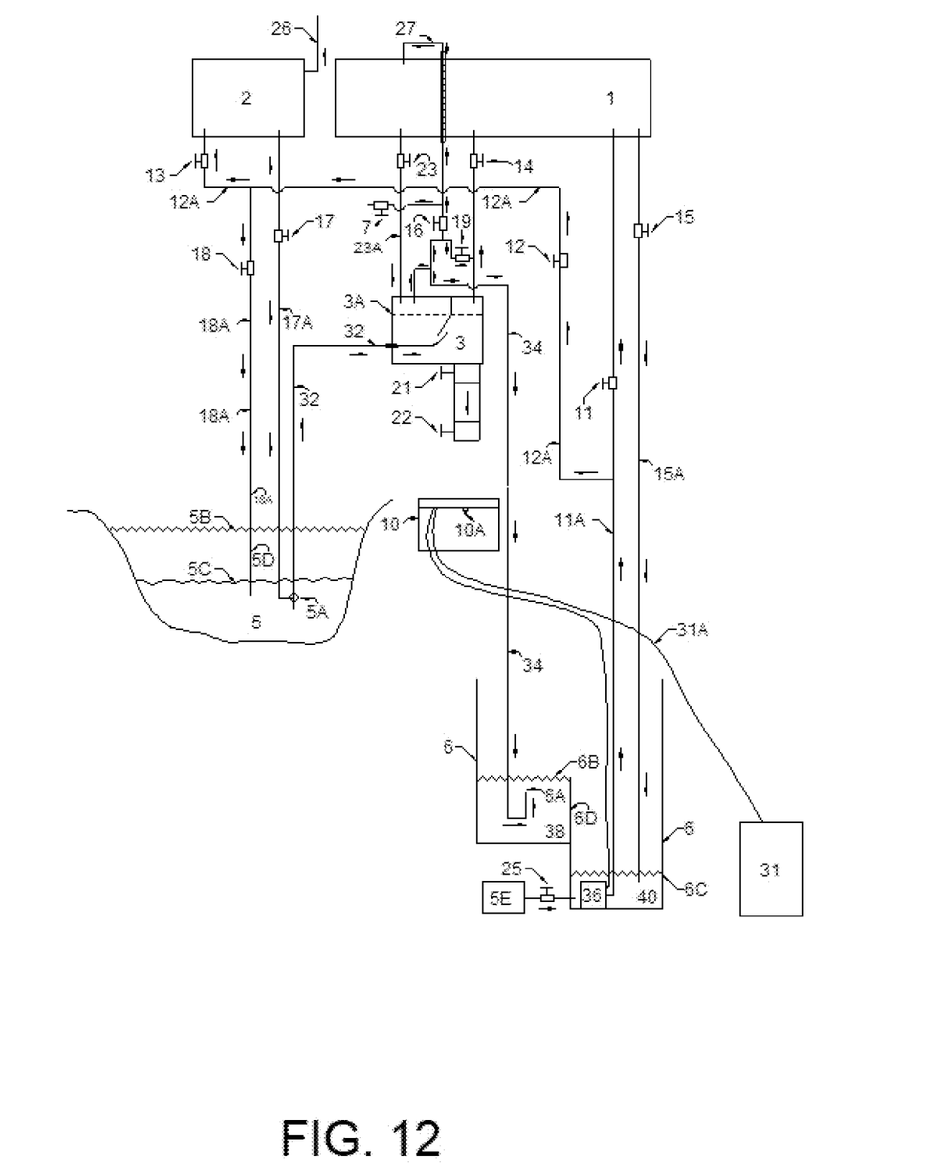
FIG. 12 Another embodiment of the sediment capture syphon system and pump

The alternative embodiment of FIG. 12 differs from the embodiment of FIG. 3 with conduit 12A receiving water flow from conduit 11A rather than from tank 1. Valve 25 functions as a filler valve that is positioned between screen 5E and pump 36.

Operation
Starting the Syphon
1. Open upper syphon vent valve 7, lower syphon vent valve 16. This allows the water in the parts to flow freely without creating an air lock. If using the demonstration model, borrow site vent valve 8, and containment basin vent valve 9 should also be opened.
2. Turn on Battery Switch 10A, to start the pump, wait 5 seconds then open pump valve 11. Water will be pumped from pump chamber 40 into upper tank 1.
3. Open left upper tank valve 12 and anti-static filler valve 13. Allow the water to fill until it stops at about ½ inch from the top of anti-static pressure tank 2.
4. Close the anti-static filler valve 13 then the left upper tank valve 12.
5. Open right upper tank valve 14, until the left side of filter 3 fills to the top. When water and air flows down the syphon tube in front of the filter 3, close the right upper tank valve 14. Open filter vent valve 19, then open center upper tank valve 23, until the right side of filter 3 fills to the top or when the level is about equal to the left side then close the center upper tank valve 23. Close filter vent valve 19.
6. Close pump valve 11 then turn off the battery switch 10 when the containment basin 6 is empty and the pump speeds up for lack of water.
7. Close the upper syphon vent valve 7 and the lower syphon vent valve 16.
8. Open the vacuum pressure valve 15, then open anti-static valve 17, then open the lower syphon vent valve 16. After a sufficient time interval, close the vacuum pressure valve 15, the anti-static valve 17 and the lower syphon vent valve 16 consecutively. Open the upper syphon vent valve 7 to release the vacuum. The syphon should be flowing at the end of this step.
9. Turn on the battery switch 10 and open the pump valve 11.
10. Open Left Upper Tank Valve 12 and the Anti-Static Filler Valve 13 to refill the Anti-Static Pressure Tank 2. Open and close the anti-static valve 17 several times to control the sediment or sand going into the syphon tube. Allowing the water to push the sediment or sand when the anti-static valve 17 is open. Close the anti-static valve 17. After the sediment or sand settles in the Borrow Site 5, open the Borrow Site Drain Valve 20, partly drain the Borrow Site 5 to about 2 inches above the sediment or sand then close the Borrow Site Drain Valve 20.

For operation of the demonstration model, between steps 2 and 3 water should be directed through pipeline flow conduit 24A to the borrow site compartment by opening pipeline flow valve 24 until water sufficiently covers sand or sediment in the borrow site compartment.

Processing the Sediment
1. Open the anti-static valve 17 and driller valve 18 then partly close the anti-static valve 18. Close anti-static valve 17 or partly close it to continue controlling the syphon flow with a steady flow of sediment slurry. To stop the syphon, open the lower syphon vent valve 16. This will let air into the syphon tubes and stop the syphon. The water in filter 3 will then flow back into the syphon tube and into the borrow site. Any fish or creatures captured in the apparatus will have the opportunity to return to the borrow site by following the water flow without harm.
2. Close the pump valve 11 and turn off battery switch 10 after pump chamber 40 is empty.
3. To release the sediment in filter 3, open filter vent valve 19. Water may flow back into the borrow site. Open lower knife valve 22.
4. Open Upper Knife Valve 21 and then close it. The sediment will fall out to be captured by using a suitable receptacle.

This description is by way of example. A reader can conceive of alternative configurations, organized differently but operating according to the principles of operation elucidated above, resulting in embodiments which are still within the spirit and scope of the present invention.

What is claimed is:
1. A sediment capture system to establish syphon action and to suspend sediment from an aquatic environmental borrow site for syphon-based filtration comprising,
   a containment basin, said containment basin comprised of a pump chamber and an outlet chamber, wherein said pump chamber is below said outlet chamber,
   a pump, said pump connected to an electric power source, said pump disposed within said pump chamber, an elevated upper tank and an elevated anti-static pressure tank, said elevated upper tank receiving water from said pump via a pump conduit said pump conduit having a pump valve, said elevated upper tank further having a vacuum pressure line in communication with said pump chamber, thereby permitting backflow of the water from said elevated upper tank to said pump chamber when vacuum pressure valve is open, said elevated upper tank connected to a filter assembly via a center upper tank conduit, said center upper tank conduit having a center upper tank valve, said filter assembly comprising an upper chamber and lower chamber, said upper chamber being separated from said lower chamber by an upper knife valve, said lower chamber disposed below said upper chamber, said lower chamber having a lower knife valve, with a space between said upper knife valve and said lower knife valve to accommodate captured sediment accumulating therein, said filter assembly connected to said elevated upper tank via said center upper tank conduit, said upper tank conduit delivering the water to said filter assembly when said center upper tank valve is open while the water is in said elevated upper tank, said filter assembly configured to receive a sediment-containing flowing slurry from a syphon influx conduit, and to discharge effluent into said outlet chamber through a syphon efflux conduit, said syphon efflux conduit having a syphon outlet with said syphon outlet disposed within said outlet chamber, said filter assembly further configured to separate and capture the sediment received from said aquatic environmental borrow site in said lower chamber, said filter assembly further configured to discharge the captured sediment by opening said lower knife valve, said filter assembly having a filter partition adapted to direct incoming air to an upper tank valve, wherein the upper tank valve in communication with said filter assembly and said elevated upper tank via a line for conducting air between said filter assembly and said elevated upper tank, wherein said filter assembly is disposed above said containment basin, above said aquatic environmental borrow site, below said elevated upper tank, and below said elevated anti-static pressure tank, a lower syphon vent valve, an upper syphon vent valve, a filter vent valve, lines for interconnecting said upper syphon vent valve, lower syphon vent valve, said filter vent valve, and said upper tank valve, said lines for connecting said upper syphon vent valve, lower syphon vent valve, said filter vent valve, and said upper tank valve further connecting to said filter assembly and said elevated upper tank, an anti-static pressure conduit from said elevated anti-static pressure tank adapted to provide the water to said syphon influx conduit, said anti-static pressure conduit and said syphon influx conduit converging at a syphon inlet connector, said syphon inlet connector adapted to be positioned within the sediment at said aquatic environmental borrow site, an anti-static pressure valve configured to control water flow through said anti-static pressure conduit, a driller conduit, said driller conduit having a driller valve, said driller conduit connected to said elevated anti-static pressure tank and adapted to extend into the sediment at said aquatic environmental borrow site and suspend the sediment at said aquatic environmental borrow site, said driller conduit connected to a line for filling said elevated anti-static pressure tank, said pump chamber and said outlet chamber positioned to enable syphon flow from said aquatic environmental borrow site to said outlet chamber.

2. The sediment capture system of claim 1 further comprising, a battery and a solar panel, said battery and solar panel configured to function as said electric power source.

* * * * *